United States Patent Office 3,081,310
Patented Mar. 12, 1963

3,081,310
BIS(AMINOALKYLCARBAMATES)
Kurt J. Rorig, Glenview, Ill., assignor to G. D. Searle & Co., Chicago, Ill., a corporation of Delaware
No Drawing. Filed Dec. 24, 1956, Ser. No. 630,053
2 Claims. (Cl. 260—294.3)

This invention relates to bis(aminoalkylcarbamates) and processes for the manufacture thereof. More particularly, this invention relates to compounds of the formula

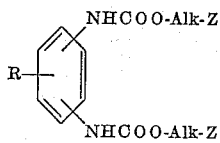

wherein R is an alkyl radical, Alk is an alkylene radical, and Z is an optionally substituted amino radical.

Among the alkyl radicals contemplated in the foregoing structural formula, so-called "lower" alkyl radicals are preferred. These include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ radicals wherein $n$ is a positive integer amounting to less than nine.

As to the alkylene radicals above comprehended, these are such as 1, 2-ethylene (—CH$_2$CH$_2$—)

Trimethylene (—CH$_2$CH$_2$CH$_2$—)

1, 2-propylene (—CH$_2$CHCH$_3$—)

Tetramethylene (—CH$_2$CH$_2$CH$_2$CH$_2$—)

2-methyl-1, 2-propylene (—CH$_2$CCH$_3$—)
          |
          CH$_3$ 2, 4-pentylene (CH$_3$CHCH$_2$CHCH$_3$)

2,2-dimethyl-1, 3-propylene (—CH$_2$CCH$_2$—)
         |
         CH$_3$
         |
         CH$_3$ 3-methyl-1, 4,-butylene (—CH$_2$CH$_2$CHCH$_2$—)
          |
          CH$_3$ and other bivalent, saturated, acyclic, straight- or branched-chain hydrocarbon radicals containing more than one and fewer than six carbon atoms.

Z in the generic formula for compounds of this invention subsumes both the unsubstituted amino radical, —NH$_2$, and the amino radical as modified by introduction of one or two alkyl groups—especially lower alkyl groups, of the type hereinabove defined. The alkyl groups present may be discreet, as when Z designates a radical of the formula

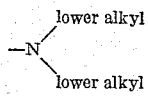

or, in the case of ethyl radicals, they may be joined together through oxygen to form the morpholino grouping. Still another variety of alkylated amino radical contemplated is that in which Z is defined by

where T is an alkylene radical containing more than three and less than eight carbon atoms, fewer than six of which are annularly disposed. It follows from this that

denotes a five- or six-membered heterocycle composed of methylene (—CH$_2$—) radicals and the single nitrogen atom shown, said heterocycle being optionally substituted by one or two alkyl groups aggregating not more than three carbon atoms. Illustrative of the cyclic amino radicals thus specified are pyrrolidinyl, 2-methylpyrrolidinyl, 2,5-dimethylpyrrolidinyl, 3-methyl-4-ethylpyrrolidinyl, piperidino, 3-methylpiperidino, and 2,6-dimethylpiperidino radicals.

Equivalent to the basic amino esters of this invention for the purposes here described are non-toxic acid addition and quaternary ammonium salts thereof, the composition of which may be symbolized by

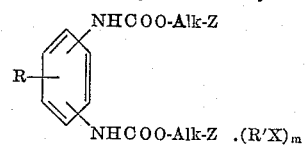

wherein R, Alk, and Z have the meanings hereinbefore assigned; R' is hydrogen or a lower alkyl radical, as above described; X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, or the like—which, in combination with the cationic portion of a salt aforesaid, is neither pharmacologically nor otherwise undesirable in pharmaceutical dosage; and $m$ is a positive integer amounting to less than three.

The compounds to which this invention relates are useful because of their valuable pharmacological properties. Thus, for example, the subject compounds are characterized by diuretic activity; and the quaternary salts disclosed are anti-secretory agents, being adapted to the control of ulcers and/or acidity in mammals.

Manufacture of the claimed compounds proceeds as follows: a diisocyanate of the formula

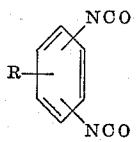

is contacted by an aminoalkanol of the formula

HO—Alk—Z during several hours at substantially room temperatures in the presence of an inert solvent such as ether, chloroform, carbon tetrachloride, n-heptane, or the like. Conversion of the amine bases of this invention so formed to the corresponding acid addition salts, is accomplished by simple admixture of these compounds with one or two equivalents of any of various inorganic and strong organic acids, the anionic portion of which conforms to X as hereinabove defined. Alternatively, the bases in question may be quaternized by contact with an alkyl ester of the formula

R'X

R' and X having the meanings hereinbefore assigned. Quaternization takes place in the temperature range between 25° and 100° centigrade, using an inert solvent such as chloroform, acetone, butanone, methanol, butanol, or the like as reaction medium. Quaternization is ordinarily completed in from 6 to 60 hours and is generally carried out in a closed system if a lower alkyl halide—such as methyl chloride—is one of the reagents. Using methyl bromide, the manufacture of quaternary salt may be smoothly effected in butanone solution at 70° centigrade, the reaction time being approximately 12 hours.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (0° C.) and relative amounts of materials in parts by weight, except as otherwise noted.

EXAMPLE 1

A. *Bis(Diethylaminoethyl) Toluene-2,4-Dicarbamate*

A mixture of 17 parts of toluene-2,4-diisocyanate, 23 parts of diethylaminoethanol, and 420 parts of anhydrous ether is heated at the boiling point under reflux for five hours. A small amount of insoluble matter is filtered from the reaction mixture, which then is stripped of solvent by evaporation. The residue is taken up in approximately 400 parts of absolute ethanol, and to the resultant solution is added two equivalents of hydrogen bromide dissolved in absolute ethanol, followed by sufficient anhydrous ether to precipitate the amine dihydrobromide thus formed. Solvent is removed by decantation, whereupon the amine base is liberated by alkalization. The base is dissolved in ether, and the ether solution then dried over anhydrous potassium carbonate and treated with decolorizing charcoal. Upon evaporation of solvent, there is obtained as a golden yellow oil, bis(diethylaminoethyl) toluene-2,4-dicarbamate. The product has the formula

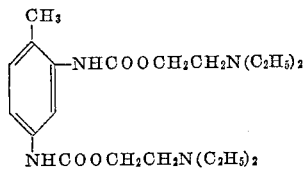

B. *Bis(Diethylaminoethyl) Toluene-2,4-Dicarbamate Dimethobromide*

To a solution of 14 parts of bis(diethylaminoethyl) toluene-2,4-dicarbamate in approximately 120 parts of butanone is added 12 parts of methyl bromide. A heavy oil precipitates in process. The reactants are maintained in a sealed kettle at room temperatures for approximately 72 hours. During this time, the oil crystallizes to a light tan solid. The product, bis(diethylaminoethyl) toluene-2,4-dicarbamate dimethobromide, is too hygroscopic to afford a significant melting point.

EXAMPLE 2

A. *Bis(3-Diethylaminopropyl) Toluene-2,4-Dicarbamate*

To 26 parts of 3-diethylaminopropanol in 350 parts of anhydrous ether is added 17 parts of toluene-2,4-diisocyanate. A moderate amount of heat is evolved. The reactants are maintained at the boiling point under reflux for approximately five hours, whereupon 10 parts of absolute ethanol is introduced to destroy excess isocyanate. The mixture is heated at the boiling point for one hour longer, following which it is filtered to remove a small amount of insoluble matter. Evaporation of solvent leaves bis(3-diethylaminopropyl) toluene-2,4-dicarbamate as a golden oil, resistant to crystallization. The product has the formula

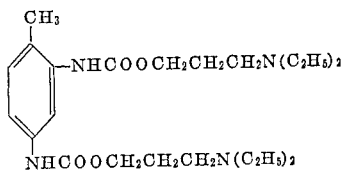

B. *Bis(3-Diethylaminopropyl) Toluene-2,4-Dicarbamate Dimethiodide*

A mixture of 34 parts of bis(3-diethylaminopropyl) toluene-2,4-dicarbamate, 34 parts of methyl iodide, and 160 parts of butanone is stored in a sealed kettle at room temperatures for 24 hours. There is a moderate heat effect when the reactants are mixed, and an oil is precipitated within one minute. At the end of the reaction period, the oil is observed to have thickened and darkened to a tacky brown "glass." Solvent is removed by decantation, whereupon the residual "glass" is taken up in 800 parts of water. The aqueous solution is treated with decolorizing charcoal, following which water is removed by lyophylization. The product thus obtained, extremely hygroscopic, is bis(3-diethylaminopropyl) toluene-2,4-dicarbamate dimethiodide.

EXAMPLE 3

*Bis(5-Diethylamino-2-Pentyl) Toluene-2,4-Dicarbamate*

A mixture of approximately 17 parts of toluene-2,4-diisocyanate, 32 parts of 5-diethylamino-2-pentanol, and 700 parts of anhydrous ether is maintained at the boiling point of the solvent for six hours under reflux. A small amount of alcohol is then added to destroy excess isocyanate, and the reactants are thereupon allowed to stand at room temperatures for two days. The reaction mixture is extracted with dilute aqueous muriatic acid; and from the resultant extract, the desired amine base is precipitated by alkalization with caustic soda. The base, in turn, is extracted into ether; and the resultant ether solution is dried over anhydrous calcium sulfate. Upon evaporation of solvent, there is obtained bis(5-diethylamino-2-pentyl) toluene-2,4-dicarbamate as the residual oil. The product has the formula

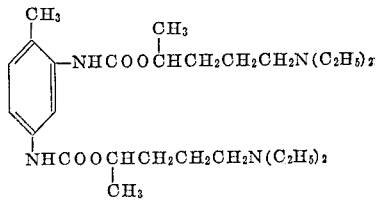

EXAMPLE 4

A. *Bis(3-Piperidino-2,2-Dimethylpropyl)Toluene-2,4-Dicarbamate Dihydrobromide*

To a suspension of 34 parts of 3-piperidino-2,2-dimethylpropanol in approximately 500 parts of anhydrous ether is slowly added 17 parts of toluene-2,4-diisocyanate dissolved in 700 parts of anhydrous ether. A mild exothermic effect is observed. The reactants are maintained at the boiling point of the solvent present for six hours, whereupon the reaction mixture is filtered to remove a small amount of insoluble matter. The filtrate is treated with two equivalents of hydrogen bromide to precipitate the ecru acid addition salt. The salt is filtered out and taken up in approximately 200 parts of absolute ethanol. To the ethanol solution, at the boiling point, is added just sufficient anhydrous ether to bring about incipient turbidity. On overnight standing at room temperatures, tan rosettes are thrown down which, in turn, are taken up in a minimum quantity of boiling absolute ethanol to which is subsequently added a small amount of ethanolic hydrogen bromide. On cooling, there precipitates as a white powder, bis(3-piperidino-2,2-dimethylpropyl) toluene-2,4-dicarbamate dihydrobromide, melting at approximately 252° C. (with decomposition). The product has the formula

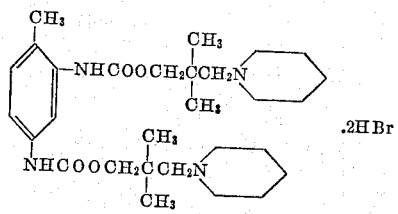

B. *Bis(3-Piperidino-2,2-Dimethylpropyl) Toluene-2,4-Dicarbamate Dimethobromide*

A solution of approximately 15 parts of bis(3-piperidino-2,2-dimethylpropyl) toluene-2,4-dicarbamate dihydrobromide in 250 parts of water is made alkaline with aqueous potassium carbonate. The amine base which precipitates is extracted into ether. The ether extract is dried over anhydrous potassium carbonate, resulting in a sky blue solution which is stripped of solvent by evaporation. The residue is taken up in approximately 120 parts of butanone, and to this solution is added 20 parts of methyl bromide. The resultant mixture is maintained in a sealed vessel at room temperatures for 20 days, precipitation occurring the while. At the end of this time, the orange solid is filtered out and washed with butanone. The product thus obtained is bis(3-piperidino-2,2-dimethylpropyl) toluene-2,4-dicarbamate dimethobromide.

What is claimed is:
1. Bis(diethylaminoethyl) toluene-2,4-dicarbamate.
2. Bis(3-piperidino-2,2-dimethylpropyl) toluene-2,4-dicarbamate.

References Cited in the file of this patent
UNITED STATES PATENTS

| | | |
|---|---|---|
| 2,033,740 | Rider | Mar. 10, 1936 |
| 2,703,810 | Viard | Mar. 8, 1955 |
| 2,878,279 | Schmid et al. | Mar. 17, 1959 |

FOREIGN PATENTS

| | | |
|---|---|---|
| 1,073,928 | France | Mar. 31, 1954 |
| 331,984 | Switzerland | Sept. 30, 1958 |

OTHER REFERENCES

Hager et al.: J. Am. Pharm. Assoc., XLV, 411–413 (1956).